United States Patent
Cox et al.

[11] Patent Number: 5,991,426
[45] Date of Patent: Nov. 23, 1999

[54] FIELD-BASED WATERMARK INSERTION AND DETECTION

[75] Inventors: Ingemar J. Cox, Lawrenceville; Matthew L. Miller, Princeton, both of N.J.

[73] Assignee: Signafy, Inc., Princeton, N.J.

[21] Appl. No.: 09/216,499

[22] Filed: Dec. 18, 1998

[51] Int. Cl.⁶ .................................................. G06K 9/00
[52] U.S. Cl. .......................................... 382/100; 348/473
[58] Field of Search ................................. 382/100, 232; 380/7, 54; 348/473

[56] References Cited

U.S. PATENT DOCUMENTS

| | | | |
|---|---|---|---|
| 5,184,849 | 2/1993 | Taylor | 238/67 |
| 5,734,752 | 3/1998 | Knox | 382/212 |
| 5,790,703 | 8/1998 | Wang | 382/212 |

OTHER PUBLICATIONS

Hsu et al., "Digital Watermarking for Video," *IEEE Proc. 13th Int. Conf. on Digital Signal Processing*, Jul. 2–4, 1997, pp. 217–220.

Hsu et al., "DCT–Based Watermarking for Video," *IEEE Transactions on Consumer Electronics*, vol. 44, No. 1, Feb. 1998, pp. 206–216.

*Primary Examiner*—Andrew W. Johns
*Attorney, Agent, or Firm*—Scully, Scott Murphy & Presser

[57] ABSTRACT

A digital watermark is inserted into multimedia data containing two image fields by placing a positive watermark into a first field and a negative watermark into a second field. The positive watermark and negative watermark are opposite of one another. The two fields can be interlaced fields of a field-based video signal or alternate rows of a frame-based video signal. The watermark is extracted from field-based watermarked data by separating the watermarked data into two fields and subtracting one of the fields from the other field to generate a watermarked signal. The resultant watermarked signal is processed in a conventional manner to extract and detect the watermark.

22 Claims, 6 Drawing Sheets

|   | 8 | ← | 720 | → |   |   |   |   |
|---|---|---|---|---|---|---|---|---|
| 8 | a | b | c | l | a | b | k | l | ⋯ | a |
|   | l | k | d | k | j | c | j | i | ⋯ | b |
|   | i | j | e | h | i | d | g | h | ⋯ | c |
|   | h | g | f | g | f | e | f | e | ⋯ | d |
| 240 | j | k | l | i | j | k | h | l | ⋯ | j |
|   | i | h | a | h | g | l | g | f | ⋯ | k |
|   | f | g | b | e | f | a | d | e | ⋯ | l |
|   | . | . | . | . | . | . | . | . | . | . |
|   | . | . | . | . | . | . | . | . | . | . |
|   | . | . | . | . | . | . | . | . | . | . |
|   | e | d | c | d | c | b | c | b | ⋯ | a |

Fig. 3a

|   | 8 | ← | 720 | → |   |   |   |   |
|---|---|---|---|---|---|---|---|---|
| 8 | a | b | c | l | a | b | k | l | ⋯ | a |
|   | l | k | d | k | j | c | j | i | ⋯ | b |
|   | i | j | e | h | i | d | g | h | ⋯ | c |
|   | h | g | f | g | f | e | f | e | ⋯ | d |
| 240 | j | k | l | i | j | k | h | l | ⋯ | j |
|   | i | h | a | h | g | l | g | f | ⋯ | k |
|   | f | g | b | e | f | a | d | e | ⋯ | l |
|   | . | . | . | . | . | . | . | . | . | . |
|   | . | . | . | . | . | . | . | . | . | . |
|   | . | . | . | . | . | . | . | . | . | . |
|   | e | d | c | d | c | b | c | b | ⋯ | a |

Fig. 3b

FIELD-BASED WATERMARK INSERTION AND DETECTION

FIELD OF THE INVENTION

The present invention relates to digital watermarking of multimedia data and particularly video data, such as MPEG video, and the detection of a watermark in compressed video.

BACKGROUND OF THE INVENTION

The proliferation of digital media such as image, video and multimedia is creating a need for a security system which facilitates the identification of the source of the media and/or access control information. The expected introduction of digital video disks (DVD) in the mass market will further exacerbate the problem.

Content providers, i.e. owners of works in digital data form, have a need to embed signals into video/multimedia data, including audio data, which can subsequently be detected by software and/or hardware devices for purposes of authenticating copyright ownership, controlling copying and display and ownership management, this is known as "watermarking."

A preferred method of watermarking or embedding signals in an image or image data is to insert the watermark into n×n blocks (subimages or subblocks) of the N×N image where n<<N. If the block size is chosen to be 8×8, i.e. the same size as that used for MPEG image compression, then it is possible to tightly couple the watermark insertion and extraction procedures to those of the MPEG compression and decompression algorithms. Considerable computational savings can then be achieved since the most expensive computations relate to the calculation of the DCT and its inverse and these steps are already computed as part of the compression and decompression algorithm. The incremental cost of watermarking is then very small typically less than five percent of the computational requirements associated with MPEG.

A review of watermarking is found in an article by Cox and Miller, entitled "A review of watermarking and the importance of perceptual modeling", in Proc. of EI'97, vol. 30-16, Feb. 9–14, 1997.

To allow for computationally efficient detection of the watermark in both the spatial and DCT domains, a watermark is inserted into sums of groups of 8×8 blocks in the DCT domain. The advantage of this approach is that, if the image is only available in the spatial domain, then the summation can also be performed in the spatial domain to compute a small number of 8×8 blocks and only these blocks must then be transformed into the DCT domain. This is because the sum of the DCT blocks is equal to the DCT of the sum of the spatial blocks. Since the computational cost of detecting watermarks is now dominated by the cost of summation, the cost of detecting in the DCT and spatial domains is approximately the same.

In U.S. patent application Ser. No. 08/928,576, filed Sep. 12, 1997, entitled "Counteracting Geometric Distortion for DCT Based Watermarking" having inventors I. J. Cox and M. J. Miller and assigned to the same assignee as the present invention, which is incorporated herein by reference, an image is divided into M disjoint sets of n×n blocks. The detection process comprises the steps of step (1) averaging all of the n×n subblocks in each of the disjoint groups to a single n×n block such that each frame is reduced to M n×n subblocks, referred to as an accumulator array. The averaging may be performed in either the pixel domain or the DCT domain. Step (2) the M n×n subblocks are further reduced to a one-dimensional vector of length M which is referred to as the extracted watermark. Step (3) a standard statistical test using correlation coefficients is used to compare the extracted watermark to a known set of possible watermarks to determine which known watermark, if any, is present in the image. Step (4) in the referenced patent application, is to repeat steps (2) and (3) after modification of the accumulator array to compensate for geometric distortion.

SUMMARY OF THE INVENTION

A video or DVD video displayed on a monitor comprises a sequence of image frames. Each image frame, in turn, may include two interlaced fields, sometimes referred to as an odd field and an even field. MPEG-2 compression supports the encoding and transmission of video data in either field or frame format.

In the present invention, watermarking insertion procedures, of the prior art, such as the one referenced above, are modified such that a watermark is inserted into two fields of the image of a video signal in such a manner that a positive watermark is inserted in one field and negative watermark is inserted into the other field. The term "positive watermark" refers to a watermark signal inserted in a first field of the image. The term "negative watermark" refers to a watermark signal which is the inverse or opposite of the positive watermark and which is inserted into the other field of the image.

When inserting a watermark into a video data sequence, it is necessary to decide whether watermark insertion should be performed on entire image frames or on individual fields. There are several advantages to using field-based watermarking. First, if a watermark is inserted into the fields, but is transmitted in frame-mode, it is only necessary to temporarily store 16 lines of the frames in order to reconstruct the corresponding fields. In contrast, if frame-based watermarking is used, but the video data is transmitted as interlaced fields, then the entire first field may have to be stored in order to reconstruct the corresponding frame. However, for the method described herein, only an additional bank of N 8×8 accumulators is needed. Second, it is possible to exploit the field-based format in order to perceptually hide the watermark. In particular, if a watermark is inserted into the even field and the negative of the watermark is inserted into the odd field, a significant masking effect is obtained. This is well known in NTSC broadcasting for the transmission of color difference signal. Watermark detection occurs in each field and temporal averaging can be applied to average the watermark over multiple fields. Of course, it is necessary to sum all the even fields and to subtract all the odd fields. This assumes the positive watermark is inserted into the even field. By reversing where the positive and negative watermarks are inserted, the summing and subtracting of fields is similarly reversed.

Similar temporal averaging can occur at the frame level. However, two distinctions are important. First, the perceptual mask in a frame level method is weaker then in a field-based method. Second, if a frame is dropped, due to, standards conversion, i.e. conversion from NTSC to SECAM, for example, then the detector is unable to know which frames contain a positive watermark and which frames contain a negative watermark. This uncertainty may be used to easily tamper with frame-based watermarking in which one frame contains a positive watermark and the next frame contains a negative watermark. However, similar tampering of field-based watermarking is not possible since significant degradation in the video quality can occur.

A third advantage of the present invention is reduction of noise in the watermark detection process. The video data is separated into two fields, each containing very similar image data (or noise data when considering watermarked data as a combination of noise plus a watermark). A positive watermark is inserted into one field and a negative watermark, the inverse of the positive watermark, is inserted into the other field. Since the two fields are highly correlated, when one watermarked field is subtracted from the other watermarked field, the two image portions (or noise portions) cancel each other and the watermarks are added together. The result is a large watermark signal with only a very small contribution from the image data. The watermark signal is subsequently extracted and decoded. The invention results in an increased watermark signal to noise ratio for watermark detection. A similar result is achieved when the fields are one-dimensional vectors used in the watermarking insertion and detection procedures. Video related data will cancel out when data from one field is subtracted from data from the other field, leaving only a watermark signal. Another advantage of the invention is the ability to insert a watermark using a field-based method where the watermark has the same amount of power as a watermark using a frame-based method. Moreover, the watermark used in the field-based method is virtually invisible to an observer. In the field-based method, a positive watermark is added to one field and a negative watermark is added to the other field. The combined power of each of the positive watermark and the negative watermark is equal to the power of a single watermark applied to both fields in the frame-based method. However, because the positive watermark and negative watermark are inverse to one another, there is a masking phenomenon that hides the watermark better than the frame-based watermark, even though the watermark power and hence the watermark detection, are the same in both methods. In the case of frame-based watermarking, it is possible to see watermark artifacts at the edge of subblocks which artifacts are not visible in the case of field-based watermarking.

Furthermore, our experimental results indicate that the differences between watermarks embedded in the two fields are generally robust to normal video processing because most video processing is performed on each field independently. This is the case even though these differences in the two watermarks represent high vertical frequencies when the watermarked fields are combined as a single frame. Moreover, tests reveal that such a watermark is also robust to certain forms of frame-based processing such as brickwall filtering (low pass filtering) and aperture filtering.

A principal object of the present invention is therefore, the provision of field-based digital watermarking.

Another object of the invention is the provision of field-based digital watermarking using a positive watermark in one set of fields and a negative watermark in the other set of fields comprising an image frame.

Further and still other objects of the invention will become more clearly apparent when the following description is read in conjunction with the accompany drawing.

Accordingly, a method of inserting a watermark into data is provided. The method comprises the steps of: receiving data to be watermarked in the form of a first and a second field; inserting a first watermark into a first field for generating a first watermarked field; inserting a second watermark, opposite of the first watermark, into a second field for generating a second watermarked field; and combining said first watermarked field and said second watermarked field for generating field-based watermarked data.

Also provided is a method of detecting a watermark in field-based watermarked data. The method comprising the steps of:

partially decoding field-based watermarked data input; summing subblocks from a first field of the data input and subtracting subblocks from a second field of the input data for generating a watermarked signal; extracting a watermark from the watermarked signal; and decoding the extracted watermark.

Lastly, a method of detecting a watermark in frame-based watermarked data is provided. The method comprising the steps of: partially decoding frame-based watermarked data input: accumulating subblocks of decoded data input; transforming the accumulated subblocks of decoded data input into pixel domain; separating the pixel domain data into a first field and a second field; summing data in the first field and subtracting data in the second field for generating accumulated watermark data arrays; transforming the accumulated watermarked data arrays into transform domain for generating a watermarked signal; extracting a watermark from the watermarked signal; and decoding the extracted watermark.

Also provided are apparatus for carrying out the methods of the present invention.

BRIEF DESCRIPTION OF THE DRAWINGS

FIGS. 3a and 3b are schematic representations of images partitioned into n×n pixel subblocks arranged in an odd field and an even field;

DETAILED DESCRIPTION

Figure 1:
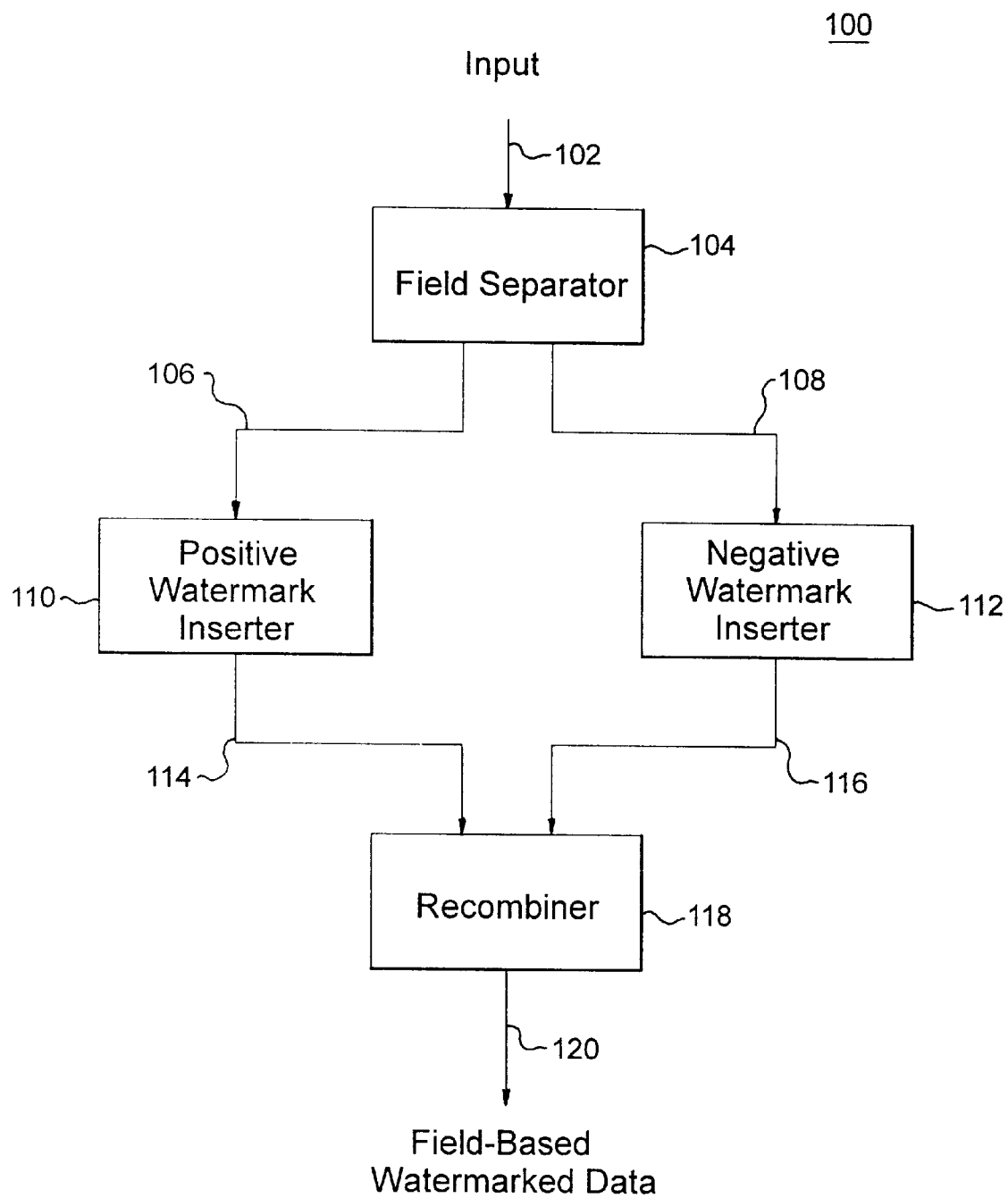
FIG. 1 is a schematic representation of a preferred method of field-based watermarking of data.

Referring now to the figures and to FIG. 1 in particular, there is shown a schematic representation of a preferred embodiment of field-based watermarking of data, generally referred to by reference numeral 100. Input data to be watermarked, e.g. video, multimedia or image data 102, is provided to a field separator device 104 which divides the input data into two fields 106, 108. If the input 102 is interlaced video, alternate rows or lines of the input video 102 are separated into two separate fields. In the case of frame based video input, alternate rows of the input video are separated to create the two fields 106, 108.

One field of the video data 106 is provided as an input to a positive watermark inserter 110 where a watermark +W is inserted into the data in a conventional manner. The other field of the video data 108 is provided as an input to a negative watermark inserter 112 where a watermark −W is inserted into the data in a conventional manner. The negative watermark is the opposite or inverse of the positive watermark. The outputs 114, 116 of the positive watermark inserter 110 and the negative watermark inserter 112 are provided as inputs to a recombiner 118. The two input signals 114, 116 to the recombiner 118 are synchronized such that the recombiner 118 effectively interlaces the two signals 114, 116 to generate a field-based watermarked data signal 120. The field-based watermarked signal 120 is the original input data 102 containing a positive watermark in one field 106 and a negative watermark in the other field 108. Since the watermark in the two fields 106, 108 are approximately the opposite of one another, a masking effect occurs such that the visual perception of the watermark is significantly reduced.

In order to better understand the invention, a brief explanation of image subblocks and the use of accumulator arrays will now be provided.

Figures 2A, 2B:
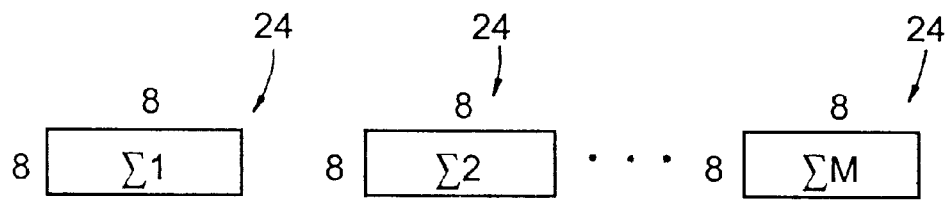
FIG. 2a is a schematic representation of an image partitioned with n×n pixel subblocks.
FIG. 2b is linear array of n×n accumulator arrays.

In FIG. 2a there is shown an image 20 partitioned into M n×n subblocks 22. The number M refers the quantity of groups into which the n×n subblocks will be partitioned. In the preferred embodiment M is equal to 38. The letters a–l in the subblocks 22 refer to a respective one of the 38 groups. If a standard video frame 480×720 is used for example, and the subblocks comprise 8×8 pixels, then there are 60×90 such subblocks in the image 20. The subblocks are partitioned into groups as shown in FIG. 2a. After each of the 38 n×n accumulators arrays 24 (identified by the letters a–l ) receive a subblock assigned to the respective accumulators, the subblocks in the row continue to be accumulated in the respective accumulators. In the present example, after 90 subblocks in one row are accumulated in their respective accumulators, the next row of video subblocks in the image is accumulated, beginning in accumulator Σ2 (FIG. 2b). The process of accumulating subblocks continues in the same manner for each row of video subblocks in the image. This method of accumulating the subblocks is used for frame-based watermarking.

The 38 n×n accumulator arrays 24 are combined into a one-dimensional vector of coefficients. The procedure used is that the contents of the accumulator arrays are subject to transformation, preferably discrete cosine transformation (DCT), but other transform such as wavelet and the like are also possible. Once the contents of each of the accumulator arrays is converted to transformed values, and in the case of DCT, the dc component and many of the high frequency components are eliminated, leaving a predetermined number of coefficients, preferably approximately 16 coefficients, of interest associated with each accumulator array 24. The first coefficient of the one-dimension vector is obtained by combining a first coefficient from the first array with a second coefficient from the same or a different array and so forth for all or for a subset of the 38 arrays. A preferred method of determining the one-dimension vector coefficient may be conceptualized as follows: arrange the significant coefficients in sequential order for each of the 38 arrays. The first coefficient is obtained by combining a first coefficient of the first accumulator array with a second coefficient obtained by skipping an ensuing predetermined number of coefficients in the sequence. Next, an ensuing predetermined number of coefficients in the sequence are skipped, and the next coefficient is combined with the previously combined coefficients. The process continues for a predetermined number of coefficients from the 38 arrays. If 16 coefficients remain in each array, the predetermined number of coefficients skipped would preferably also be 16.

The second coefficient of the one-dimensional vector begins with a second coefficient of the first array and continues as described above skipping a predetermined number of coefficients in the sequence. This procedure continues as described above for each of the coefficients in the one-dimensional vector. The result is an one-dimensional vector array of the coefficients, the vector having a length 38 in the above example.

It will be apparent to those skilled in the art that the quantity of significant coefficients and the manner of combining the coefficients from each array to form the one-dimensional vector can be varied from that described above to result in a one-dimensional vector of coefficients.

Such watermarking techniques are described, for example, in U.S. patent application Ser. Nos. 08/715,953, 08/746,022, and 08/928,576. The above description is applicable to a frame-based watermarking method. According to the present invention however, the image frame is separated into "odd" fields and "even" fields. For purposes of explanation, referring to FIG. 2a, rows having an odd number are considered the odd field and rows having an even number are considered the even field.

When the watermark is inserted into each field, a positive watermark, +W, is inserted into one field and a negative watermark, –W, is inserted into the other field. Since the watermark in the two fields are approximately the opposite of one another, a masking effect occurs such that the visual perception of the watermark is significantly reduced.

The field-based subblocks are accumulated by adding corresponding subblocks of one field and subtracting corresponding subblocks of the other field. Adding and subtracting subblocks refer to the accumulating of subblock in accumulators 1, 2, 3, etc.

FIGS. 3a and 3b show the image subblocks arranged in an odd field (FIG. 3a) and an even field (FIG. 3b). The image subblocks are constructed in the same manner for each field, except that the interlaced frame is separated into the odd field and into the even field.

Figure 4:
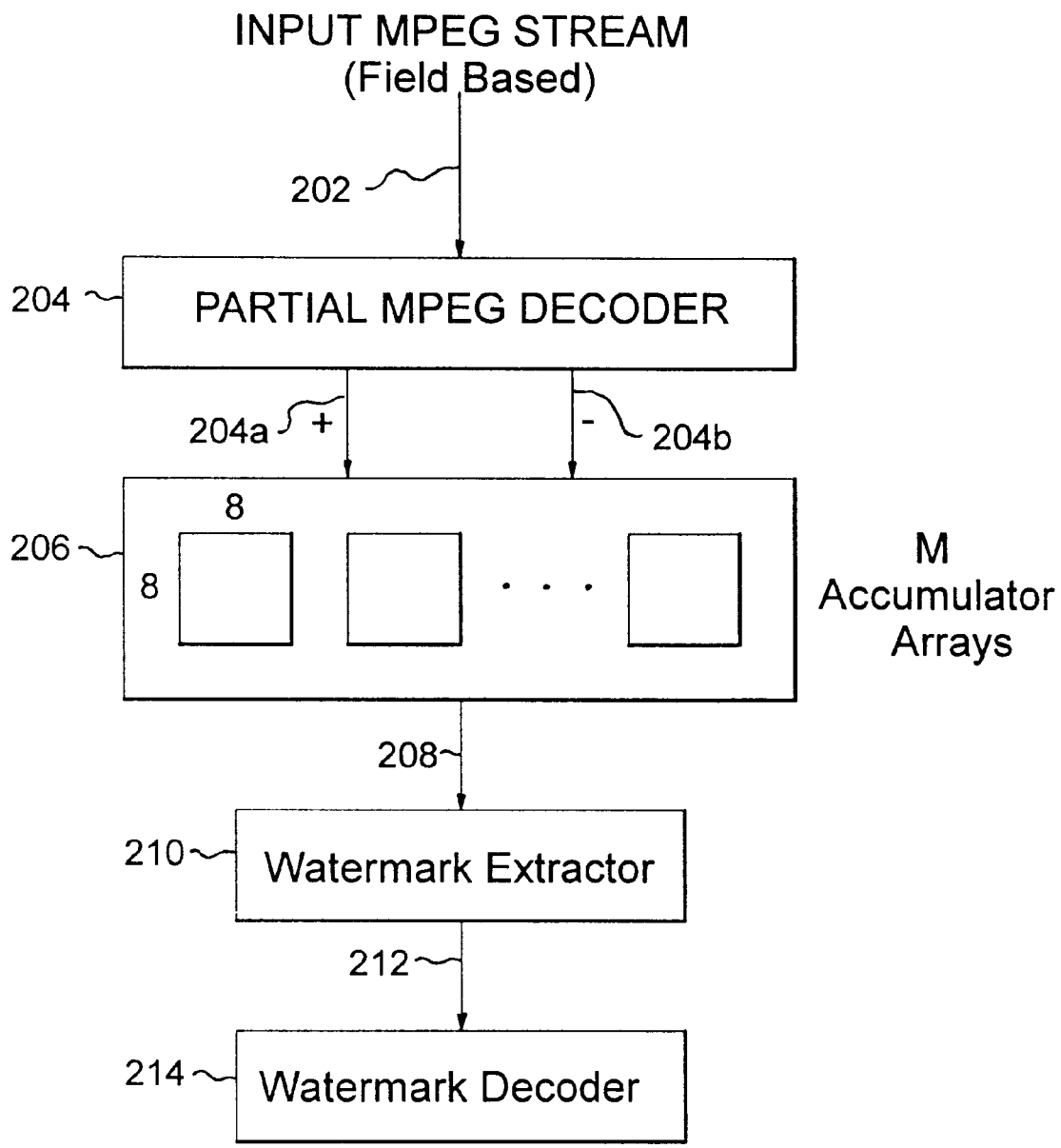
FIG. 4 is a preferred embodiment of practicing watermark extraction according to the present invention.

Referring now to FIG. 4, a first preferred embodiment of practicing the watermark extraction aspect of the present invention is shown and generally referred to by reference numeral 200.

Input 202 includes a watermark +W inserted into one field of the video signal and a watermark –W inserted into the other field of the video signal. The input 202 is preferably a field-based MPEG-2 encoded video signal. The watermark insertion is performed in a conventional manner such as is described in U.S. patent application Ser. Nos. 08/715,953, 08/746,022, and 08/928,576, which are incorporated herein by reference. The input 202 must be partially decoded in decoder 204 in order to access the DCT coefficients for watermark extraction. If the input 202 is field-based, M n×n accumulator arrays 206 are filled by summing the subblocks from one field 204a and subtracting the corresponding subblocks from the other field 204b. The output 208 of the M accumulator arrays 206 are provided to the input of a watermark extractor 210. The output 212 of the watermark extractor 210 is provided to the input of a watermark decoder 214 which detects the presence of a watermark in the input MPEG stream video data 202.

Figure 5:
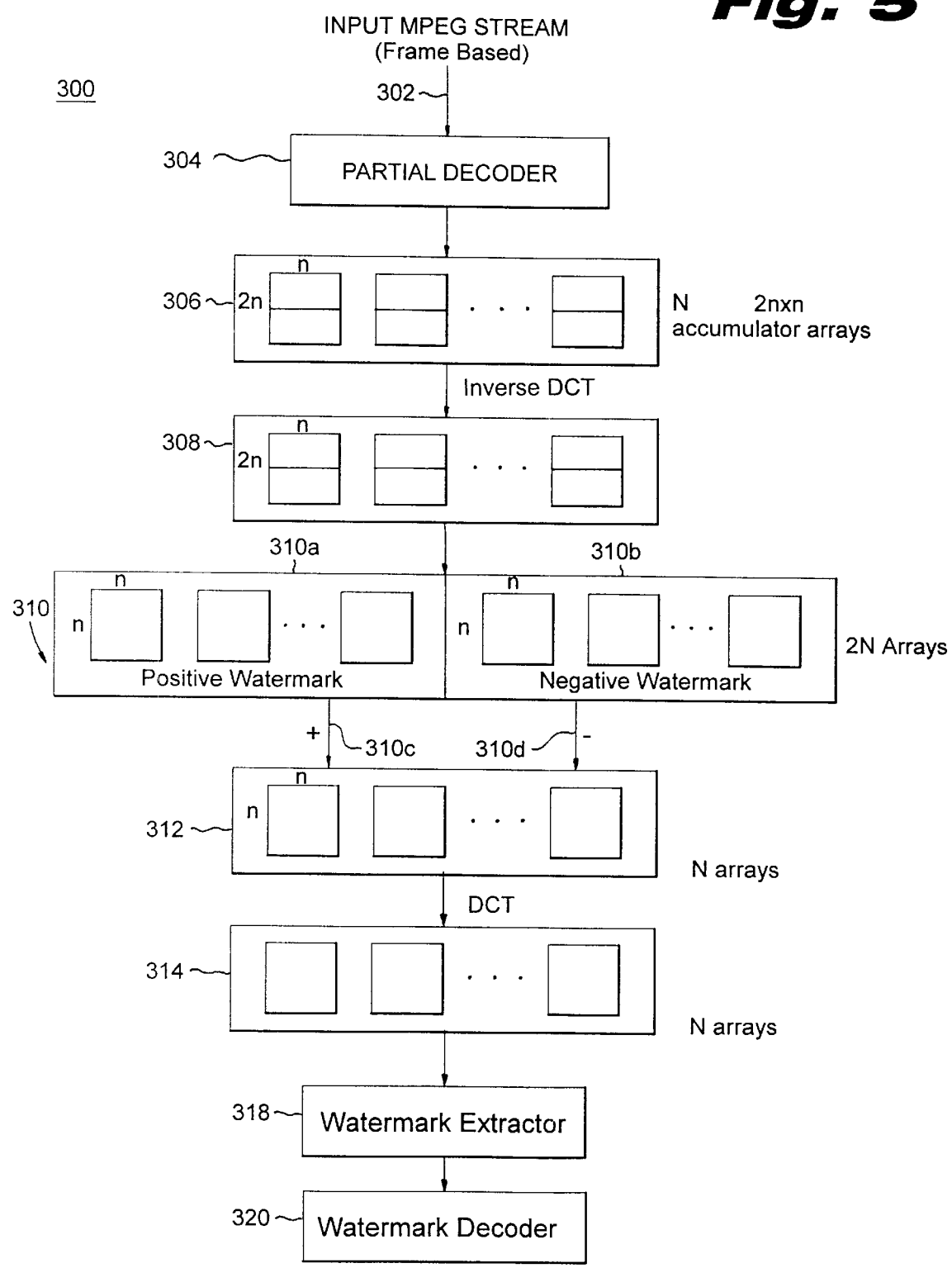
FIG. 5 is an alternative preferred embodiment of the present invention.

Referring now to FIG. 5, a second preferred embodiment of the present invention is shown and generally referred to by reference numeral 300, wherein the input signal 302 is a frame-based MPEG 2 video signal. The input signal 302 is provided to partial decoder 304 to partially decode the video signal 302 to access its DCT coefficients. The accumulator array 306 is modified to have N 2n×n blocks, i.e. for 8×8 MPEG-2 blocks, the frame accumulator 306 comprises N 16×8 blocks. The 16×8 blocks contain both of the watermarked fields. The odd rows contain one field and the even rows contain the other field. Each frame is accumulated into the array 306 after which an inverse DCT is performed on each block 308. The resulting array 310 is a pixel domain representation of the accumulated data in 2n×n blocks which can then be separated into the group of n×n field accumulator arrays. The first group 310a contains the data including a positive watermark 310c from one field and the second group 310b contains the data including a negative watermark 310d from the other field. The data from the second group of arrays is subtracted from the data in the corresponding first group of arrays to form N n×n accumulator array 312. The data in array 312 is subjected to DCT conversion 314 to convert the data into the DCT domain 316. The watermark is extracted in watermark extractor 318 and is provided to decoder 320 to determine the presence of a watermark.

Figure 6:
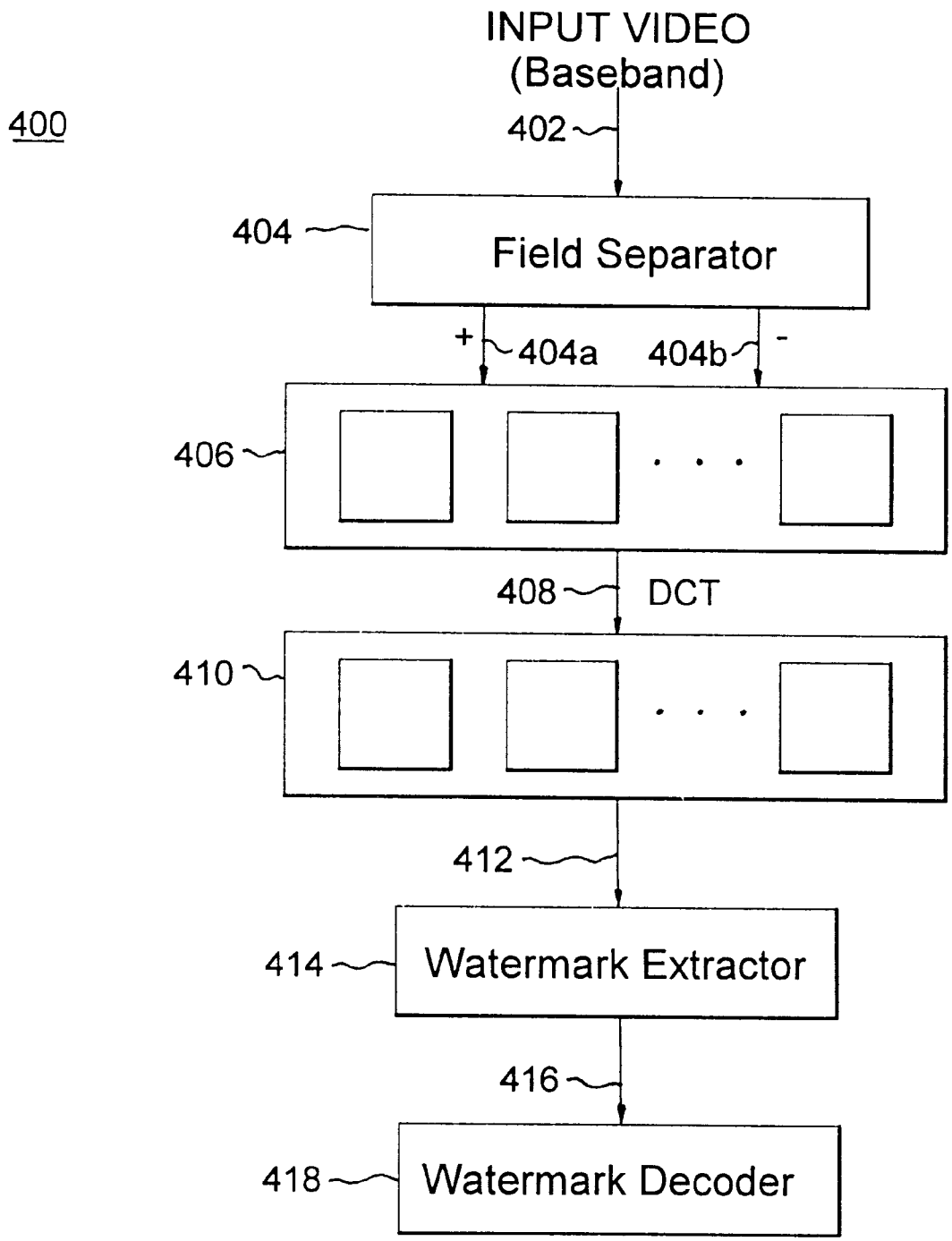
FIG. 6 is another alternative preferred embodiment of the present invention.

Referring now to FIG. 6, a third preferred embodiment of the present invention is shown and generally referred to by reference numeral 400, wherein the input signal is fully decoded such that pixel intensities are available. In this case, baseband video 402 is separated into two fields 404a, 404b by field separator 404. The separate field pixels are accumulated into N n×n arrays 406, each pixel either being added or subtracted to the corresponding accumulator block depending upon whether the pixel is from a first field or a second field of the frame. The data in array 406 is subject to DCT conversion to convert the data into the DCT domain. The DCT values 408 are provided to accumulator array 410.

The output 412 of the array 410 is provided directly to a watermark extractor 414. The output 416 of watermark extractor 414 is provided to watermark decoder 418 to determine the presence of a watermark.

While the above description is described in terms of an apparatus embodiment, it will be apparent to those skilled in the art this invention may be embodied and performed completely by software contained on an appropriate storage medium for controlling a computer.

While there has been described and illustrated a method and application for field-based watermark insertion and detection in video, multimedia or image data signals, it will be apparent to those skilled in the art that variations and modifications are possible without deviating from the broad teachings and spirit of the invention which shall be limited solely by the scope of the claims appended hereto.

What is claimed is:

1. A method of inserting a watermark into data comprising the steps of:

receiving data to be watermarked in the form of a first and a second field;

inserting a first watermark into a first field for generating a first watermarked field;

inserting a second watermark, opposite of the first watermark, into a second field for generating a second watermarked field; and combining said first watermarked field and said second watermarked field for generating field-based watermarked data.

2. A method of inserting a watermark into data as set forth in claim 1, where said data is a field-based video input signal.

3. A method of inserting a watermark into data as set forth in claim 1, where said data is a frame-based video input signal.

4. A method of inserting a watermark into data as set forth in claim 1, where said data is a baseband video input signal.

5. A method of inserting a watermark into data as set forth in claim 1, where said receiving data comprising separating an interlaced video signal into two fields.

6. A method of inserting a watermark into data as set forth in claim 1, where said receiving data comprises separating a frame-based video signal into two fields by separating alternate rows of the video signal.

7. An apparatus for inserting a watermark into data comprising:

separator means for receiving an input data signal and separating the input data signal into a first and second field;

first watermark inserter for inserting a first watermark into the first field for generating a first watermarked field;

second watermark inserter for inserting a second watermark, opposite the first watermark, into the second field for generating a second watermarked field; and a recombiner for combining said first watermarked field and said second watermarked field for generating field-based watermarked data.

8. An apparatus as set forth in claim 7, where said data is interlaced video and said separator means separates the interlaced video into first and second fields.

9. An apparatus as set forth in claim 7, where said data is frame-based video and said separator means separates alternating rows of video into first and second fields.

10. An apparatus as set forth in claim 7, further comprising synchronizing means for synchronizing said first watermarked field and said second watermarked field as inputs to said recombiner.

11. A method of detecting a watermark in field-based watermarked data comprising the steps of:

partially decoding field-based watermarked data input;

summing subblocks from a first field of the data input and subtracting subblocks from a second field of the input data for generating a watermarked signal;

extracting a watermark from the watermarked signal; and decoding the extracted watermark.

12. A method of detecting a watermark as set forth in claim 11, where said first field and said second field are interlaced rows of field-based watermarked data.

13. A method of detecting a watermark as set forth in claim 11, where said first field and said second field are alternate rows of field-based watermarked data.

14. A method of detecting a watermark as set forth in claim 11, where a watermark in said first field is the opposite of a watermark in said second field.

15. An apparatus for detecting a watermark in field-based watermarked data comprising:

decoder for partially decoding field-based watermarked data input;

accumulator arrays for summing subblocks from a first field of the data input and subtracting subblocks from a second field of the input data for generating a watermarked signal;

watermark extractor for extracting a watermark from the watermarked signal; and watermark decoder for decoding the extracted watermark.

16. An apparatus as set forth in claim 15, where a watermark in said first field is the opposite of a watermark in said second field.

17. A method of detecting a watermark in frame-based watermarked data comprising the steps of:

partially decoding frame-based watermarked data input;

accumulating subblocks of decoded data input;

transforming the accumulated subblocks of decoded data input into pixel domain;

separating the pixel domain data into a first field and a second field;

summing data in the first field and subtracting data in the second field for generating accumulated watermark data arrays;

transforming the accumulated watermarked data arrays into transform domain for generating a watermarked signal;

extracting a watermark from the watermarked signal; and decoding the extracted watermark.

18. A method of detecting a watermark in frame-based watermarked data as set forth in claim 17, where said data input comprises n×n subblocks and said accumulating subblocks, accumulates said data input in arrays having 2n×n dimension.

19. A method of detecting a watermark in frame-based watermarked data as set forth in claim 17, where said first field and said second field are contained in alternating rows in the subblocks.

20. An apparatus for detecting a watermark in frame-based watermarked data comprising:

decoder for partially decoding frame-based watermarked data input;

accumulator array for accumulating subblocks of decoded data;

first transform means for transforming said accumulator array subblocks of decoded data into pixel domain;

first accumulator arrays for accumulating data in a first field of pixel domain accumulated subblocks;

second accumulator arrays for accumulating data in a second field of pixel domain accumulated subblocks;

third accumulator means for accumulating watermarked data by subtracting data in the second field of pixel domain from data in the first field of pixel domain;

second transform means for transforming said accumulated watermarked data into a transform domain for generating a watermarked signal;

watermark extractor for extracting a watermark from said watermarked signal; and watermark decoder for decoding the extracted watermark.

21. An apparatus for detecting a watermark in frame-based watermarked data as set forth in claim 20, where said first transform means and said second transform means transform data between pixel domain and discrete cosine transform domain.

22. An apparatus for detecting a watermark in frame-based watermarked data as set forth in claim 20, where said first and second accumulator arrays comprise arrays of 2n×n subblocks, where the first field and second field are contained in alternate rows of the accumulator arrays.

* * * * *